(12) United States Patent
Horn et al.

(10) Patent No.: US 9,929,942 B2
(45) Date of Patent: Mar. 27, 2018

(54) REMOTE ACCESS TO A RESIDENTIAL MULTIPATH ENTITY

(71) Applicant: Telefonaktiebolaget L M Ericsson (publ), Stockholm (SE)

(72) Inventors: Uwe Horn, Aachen (DE); Robert Skog, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 140 days.

(21) Appl. No.: 14/770,958

(22) PCT Filed: Aug. 17, 2015

(86) PCT No.: PCT/EP2015/068849
§ 371 (c)(1),
(2) Date: Aug. 27, 2015

(87) PCT Pub. No.: WO2017/028898
PCT Pub. Date: Feb. 23, 2017

(65) Prior Publication Data
US 2017/0054631 A1    Feb. 23, 2017

(51) Int. Cl.
*G06F 13/00* (2006.01)
*H04L 12/707* (2013.01)
(Continued)

(52) U.S. Cl.
CPC .......... *H04L 45/24* (2013.01); *H04L 65/1069* (2013.01); *H04L 67/42* (2013.01); *H04L 69/14* (2013.01); *H04W 40/02* (2013.01)

(58) Field of Classification Search
CPC ..... H04L 69/14; H04L 45/24; H04L 65/1069; H04L 67/42; H04W 40/02
(Continued)

(56) References Cited

U.S. PATENT DOCUMENTS 5,801,750 A  *  9/1998  Kurihara ................ G06Q 30/02
                                                    348/E7.07
8,767,625 B2 *  7/2014  Krishnaswamy ... H04W 76/026
                                                    370/328
(Continued)

OTHER PUBLICATIONS

Deng, L., et al., "Use-cases and Requirements for MPTCP Proxy in ISP Networks", MPTCP Working Group Internet-Draft, Oct. 24, 2014, pp. 1-18, IETF.

*Primary Examiner* — Kenneth R Coulter
(74) *Attorney, Agent, or Firm* — Coats & Bennett, PLLC

(57) ABSTRACT

The invention relates to a method for controlling, by a multipath control entity (100), a remote access from a client device (300) to a server (235) connected to a residential multipath entity, via a multipath connection. The multipath connection includes at least two transmission networks (11, 12) between the client device (300) and the server (235). The method comprises the following steps: First, a session request for an establishment of a data session is received from the residential multipath entity (200), the session request indicating that the session request is for the remote access to the server (235). Then, a session identifier is determined for the remote access including the multipath connection. Then, in a response to the received session request the determined session identifier is transmitted back to the residential multipath entity.

34 Claims, 14 Drawing Sheets

(51) Int. Cl.
*H04L 29/06* (2006.01)
*H04W 40/02* (2009.01)

(58) Field of Classification Search
USPC ......... 709/239, 238, 227–229, 203, 217–219
See application file for complete search history.

(56) References Cited

U.S. PATENT DOCUMENTS

| | | | |
|---|---|---|---|
| 9,009,338 B2* | 4/2015 | Dankberg | H04B 7/18591 709/231 |
| 2004/0081159 A1* | 4/2004 | Pan | H04L 65/1069 370/395.2 |
| 2010/0246577 A1 | 9/2010 | Wu | |
| 2013/0275615 A1* | 10/2013 | Oyman | H04L 65/60 709/231 |
| 2013/0318239 A1 | 11/2013 | Scharf et al. | |
| 2015/0215225 A1 | 7/2015 | Mildh et al. | |

* cited by examiner

REMOTE ACCESS TO A RESIDENTIAL MULTIPATH ENTITY

TECHNICAL FIELD

The present invention relates to a method for controlling a remote access from a client device to a server connected to a residential multipath entity and to the corresponding multipath control entity controlling the remote access. It furthermore relates to a method for operating the residential multipath entity and to the corresponding multipath entity. Furthermore, a computer program and a carrier comprising the computer program is provided.

BACKGROUND

FIG. 1 shows high-level architecture which can help to improve a bandwidth of a data connection between a client end user and the Internet. The solution shown in FIG. 1 uses two connections from a client 30 to an internet server 20 accessible over the Internet, e.g. a fixed network 11, such as a DSL connection, and a mobile network 12. This solution is known as multipath TCP based hybrid access solution for hybrid access which is based on multipath TCP (transfer control protocol) as defined in IETF.

The solution involves a customer premises equipment, CPE, 10 on the client side, which provides at least two interfaces, e.g. two WAN (wide area network) interfaces, such as DSL and LTE communicating with a proxy, such as multi-service proxy, MP-TCP Proxy 17 of FIG. 1. For the download of data from the internet server 20 the data can be split at MP-TCP Proxy17 and sent via the fixed network 11 and BNG (border network gateway) 14 to CPE 10 and via the mobile network 12 passing PGW 13 (packet gateway). A policy control entity 16 controls the policies required for the data transmission. Between the CPE device and the client end device and between MSP 17 and the Internet servers, normal TCP is used.

A remote access by a client to home content, e.g. as stored on a home server connected to a home client 30 and/or CPE 10, is one important use case. Since DSL speeds are highly asymmetric, remote access to home content suffers from uplink limitations. By way of example, in case of a 6 Mbps (Mega bit per second) DSL line, only 600 kbps (kilo bit per second) are typically available in the uplink direction. For a remote user requesting data from a residential server, these uplink limitations will become a bottleneck for transmitting data from the residential server to the remote user. Thus, it would be desirable to benefit from the hybrid access shown in FIG. 1 so that data from the client 30 can be sent to a remote client using two transmission networks.

However, the remote access cannot be supported in a straightforward way by the architecture as shown in FIG. 1. This non-existing support is based on the following two problems:

First of all, currently there exists no possibility that the network initiates a wireless IP connection over a mobile communications network such as 2G/3G or 4G. For security reasons, any IP connection can only be triggered by an end device holding a SIM (Subscriber Identity Module) card. Thus, a cellular data connection over a cellular network cannot be established from a network proxy.

Secondly, it cannot be assumed that the remote client in the public Internet knows the address of the network proxy. It only knows the fully qualified domain name (FQDN) of the home server. A CPE 10 gets public IP addresses assigned which can change dynamically. Today, a remote access to a CPE 10 always requires the use of the FQDN. The CPE is configured for updating the mapping between this FQDN and a public IP address whenever the public IP address changes. In this way, it can be guaranteed that whenever a user uses the FQDN, it is routed to the CPE device at home.

Thus, one problem in a hybrid access scenario for remote access it that the connection establishment is always made via TCP as it is initiated by a non-MP(multipath)-TCP capable end device. Since normal IP routing is used, this TCP session is terminated at the CPE devices. Thus, it is currently not possible to involve the MP-TCP proxy 17.

SUMMARY

Accordingly, a need exists to avoid at least some of the above-mentioned problems and to allow the use of two transmission networks for a remote access to a home server such as the CPE of FIG. 1, resp. devices connected to the CPE.

This need is met by the features of the independent claims. Further aspects are described in the dependent claims.

According to one aspect, a method for controlling a remote access from a client device to a server connected to a residential multipath entity is provided, wherein the controlling is carried out by a multipath control entity, wherein the remote access is obtained via a multipath connection including at least two transmission networks between the client device and the server. According to one step, a session request for an establishment of a data session is received from the residential multipath identity, the session request indicating that the session request is for the remote access to the server. Furthermore, a session identifier is determined for the remote access including the multipath connection and in response to the received session request, the determined session identifier is transmitted back to the residential multipath entity.

When the multipath control entity learns that a remote access to the server via the residential multipath entity is required, a session identifier is determined which is needed later on by the residential multipath entity and other entities to identify the required session.

It is possible that the multipath control entity furthermore informs a network multipath proxy involved in a multipath connection about the determined session identifier for the remote access. In this embodiment, the network multipath proxy learns about the session request for the remote access from the multipath control entity, however, the network multipath proxy may also be informed by other entities such as the residential multipath entity about the session identifier. The session identifier will then be used by the network multipath proxy to achieve a binding between a session part existing between the residential multipath entity and the network multipath proxy and the other session part generated between the remote client and the network multipath proxy.

The invention furthermore relates to the corresponding multipath control entity carrying out the steps above and comprising an interface configured to receive the session request and comprising at least one processing unit configured to determine the session identifier and to initiate the transmission of the determined session identifier back to the residential multipath entity.

According to another aspect, a method for operating a residential multipath entity is provided which is connected to a server, wherein the residential multipath entity is configured to provide a multipath connection including at least two transmission networks between the server and a client device. The residential multipath entity receives a content request from a client device for a remote access to content provided on the server. Furthermore, a session request for an establishment of a data session including the multipath connection is transmitted to a multipath control entity, wherein the session request indicates that the session request is for the remote access from the client device to the server. A session response is received from the multipath control entity, wherein the session response comprises a session identifier for the remote access including the multipath connection. Additionally, the multipath connection between the residential multipath proxy and a network multipath proxy involved in a multipath connection which is to be used by the client device for the remote access is established. Furthermore, a network address of the network multipath proxy is determined taking into account the received session identifier. Furthermore, a redirect message is transmitted to the client device including the determined network address of the network multipath proxy.

Based on a session identifier, the residential multipath entity can determine the network address of the network multipath proxy involved in the multipath connection and can transmit this network address to the remote client. The remote client then knows which network node in the network, here the network multipath proxy should be contacted in order to obtain a remote access to the content on the server.

Furthermore, the invention relates to the corresponding residential multipath entity configured to operate as mentioned above, wherein the residential multipath entity, inter alia, comprises an interface for communication to the at least one server, the client device, the multipath control entity. Furthermore, a processing unit is configured to initiate different operation steps as mentioned above. Furthermore, a proxy is provided configured to establish the multipath connection between the residential multipath entity and the network multipath proxy in the multipath connection.

The invention furthermore relates to a system comprising the multipath control entity and the residential multipath entity as discussed above. Furthermore, a computer program comprising program code to be executed by the at least one processing unit of the multipath control entity or the residential multipath proxy is provided wherein execution of the program code causes the at least one processing unit to execute the method steps described above and as described in further detail below. Additionally, a carrier comprising the computer program is provided.

Features mentioned above and features yet to be explained in more detail below may not only be used in isolation or in combination as explicitly indicated, but also in other combinations. Features and embodiments of the present application may be combined unless explicitly mentioned otherwise.

BRIEF DESCRIPTION OF THE DRAWINGS

Various features of embodiments will become more apparent when read in conjunction with the accompanying drawings. In these drawings.

DETAILED DESCRIPTION OF EMBODIMENTS

Figure 1:
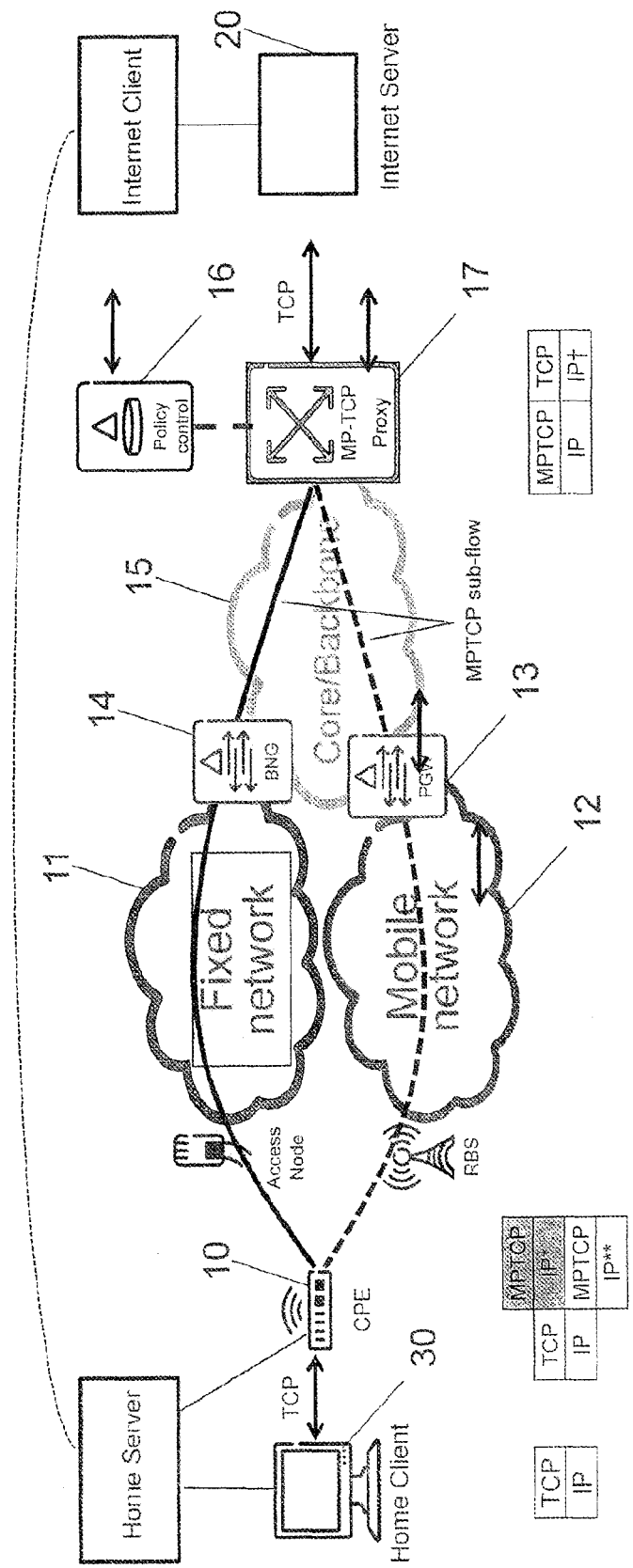
FIG. 1 is a schematic high-level architecture representation of a multipath solution known in the art.

In the following, embodiments of the invention will be described in detail with reference to the accompanying drawings.

It is to be understood that the following description of embodiments is not to be taken in a limiting sense. The scope of the invention is not to be intended to be limited by the embodiments described herein or by the drawings which are to be taken demonstratively only.

The drawings are to be regarded as being schematic representations, and elements illustrated in the drawings are not necessarily shown to scale. Rather, the various elements are represented such that their function and general purpose becomes apparent to a person skilled in the art. Any connection or coupling between functional blocks, devices, components or other physical or functional units shown in the drawings or described herein may also be implemented by an indirect connection or coupling. A coupling between components or functional elements may be established over a wired or wireless connection. Functional blocks may be implemented in hardware, firmware, software or a combination thereof.

As described in the introductory part of the invention, several challenges exist in the prior art to establish a multipath connection from a remote client to a residential multipath entity. It cannot be assumed that the remote client provided in the public Internet knows the address of a network multipath proxy involved in the multipath connection, only the fully qualified domain name of the residential multipath entity is known. Furthermore, a cellular data connection like over LTE cannot be established from a network proxy. It can only be established from a device holding a SIM card, which, in the present case, can be assumed to be the residential multipath entity.

The invention addresses this challenge by starting from a remote client provided in a public Internet using a TCP connection over the public Internet to the residential server. This connection is then modified in that the remote client in a public Internet uses a TCP connection over the public Internet to the network multipath proxy, e.g. the aforementioned MP-TCP proxy, from where a multipath TCP connection, e.g. over a wired and a wireless network such as a DSL network and a LTE network connection is established to the residential multipath entity or proxy. From there, a TCP connection over LAN can be established to the residential server.

The remote client uses the FQDN of the residential multipath entity for the initial connection setup via TCP. The residential multipath entity may then analyze the incoming TCP request and checks whether a multipath TCP (MP-TCP) session should be set up. If this is not the case, then the TCP session will continue in the normal way. If, however, it is decided by the residential multipath entity that a MP-TCP session should be established between the residential multipath entity and a network multipath proxy, the residential multipath entity will, inter alia, check whether interfaces are associated with the different data paths which should be used during the multipath session, e.g. if the LTE interface has an assigned IP address. If not, the residential multipath entity will trigger a PDP (packet data protocol) context activation over LTE which will result in an IP address assigned to the LTE interface.

Furthermore, the residential multipath entity will send a special MP-TCP connection request to a multipath control entity indicating that this connection request has been triggered by a remote client device. The multipath control entity will return a session identifier, e.g. an IP address and port number combination back to the multipath control entity. The residential multipath control entity can then send an HTTP redirect message back to the remote client which includes the IP address and port number combination instructing the remote client device to re-establish a connection to the IP address and port number combination received in the redirect message. Thus, the remote client device then knows how to contact the network multipath proxy.

The remote client device can then send a HTTP connect request to the IP address/port number received in the redirect message. Based on this IP address/port number combination the network multipath proxy involved in the connection can map this connection which was triggered by the multipath control entity in an earlier step. Thus, the network multipath proxy is able to generate a binding between the two sessions, namely the session from the residential multipath entity to the network multipath proxy and the session from the remote client to the network multipath proxy.

Figure 2:
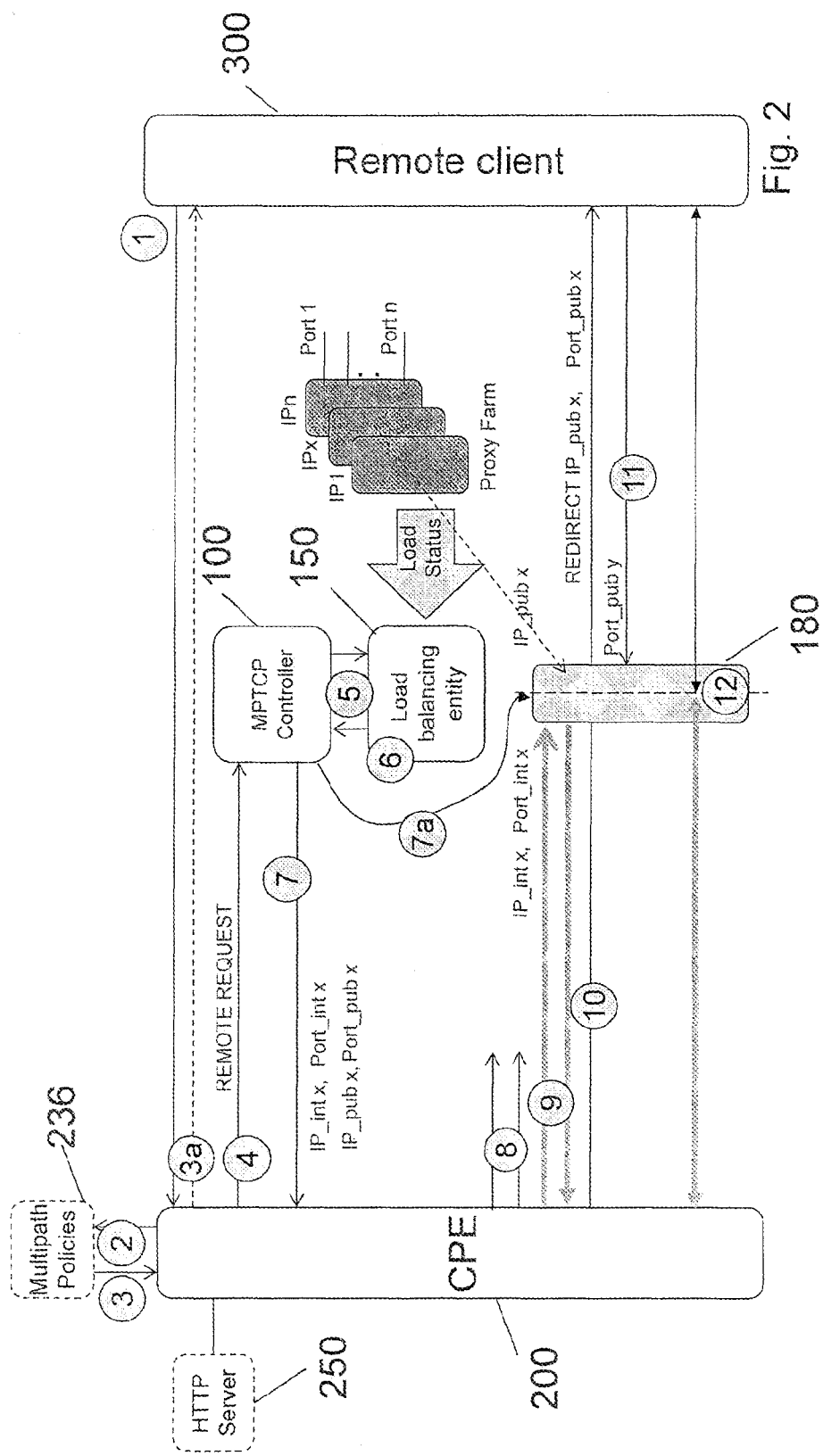
FIG. 2 is a schematic view of a message exchange between the different entities involved in a multipath connection with which according to the invention a remote access using the multipath connection is possible.

FIG. 2 shows one possible embodiment how a multipath connection established from a remote client can be established and how a network multipath proxy involved in the multipath connection can combine the different sessions involved. In the following Figures the method steps S1, S2, etc. are shown as circles enclosing the corresponding method step, so that the number 1 enclosed by the circle corresponds to step S1. In step S1 shown in FIG. 2, a remote client 300 transmits a content request for a remote access to a residential multipath entity 200 or CPE (Customer Premises Equipment) connected to a web server 250, which can be considered to be a residential server in this example. In step S2, the residential multipath entity checks multipath policies 236 provided in the residential multipath entity where it is decided whether the session is eligible for a multipath connection. In step S3, the result is sent back to the residential multipath entity 200. If no multipath connection should be set up, a standard HTTP session setup will continue as symbolized in step S3a. If the session is eligible for a multipath connection, the method continues in step S4. In step S4, a session request for an establishment of a data session including the multipath connection is transmitted to a multipath control entity, here the MP-TCP controller 100. The request transmitted in step S4 indicates that the session request is for the remote access from the client device 300 to the server 250. In step S5, the MP-TCP controller accesses a load balancing entity 150 which may be provided inside or outside the MP-TCP controller in order to identify one network multipath proxy out of a pool of network multipath proxies 180a-180n which should proxy the connection, step S6 providing the response with the selected proxy 180. The MP-TCP controller 100 then generates a session identifier which will later on allow the selected network multipath proxy 180 to obtain a binding between a session generated between the residential multipath entity 200 and the network multipath proxy 180 on the one side and the remote client 300 and the network multipath proxy 180 on the other side. As indicated in step S7, the session identifier comprises or corresponds to the public IP address and the public port number which the remote client 300 should use later on when accessing the network multipath proxy 180. In step S7a, the MP-TCP controller 100 informs the selected proxy 180 about the network address, here the internal IP address and port number and the public network address, IP_pub, Port_pub.

In step S8, the residential multipath entity or CPE 200, if needed, triggers the activation of interfaces associated with the various data paths which should be used during the multipath session. The data path can contain a wired and a wireless connection as shown in FIG. 1, however, two different wired transmission paths or two wireless transmission paths are also possible. In step S9, the residential multipath entity 200 sets up an MP-TCP session using the internal IP address and port number received in step S7, the network multipath proxy acknowledging the request so that the session is set up. In step S10, the residential multipath entity 200 sends a redirect message to the remote client including the public IP address and port number as shown in FIG. 2. In step S11, the remote client 300 then sends a new session request to the IP address and port number received in the redirect message in step S10. In step S12, the network multipath proxy 180 can then bring together the session set up in step S9 with the session that was set up in step S11.

As can be deduced from FIG. 2, the public IP address and port number is used as a session identifier which helps the multipath network proxy to combine the correct sessions.

In connection with the following FIGS. 3 to 8, slightly amended versions compared to the embodiment shown in FIG. 2 are explained in more detail. In this context, it should be noted that only some of the steps are discussed in more detail. The steps carrying the same reference numerals correspond to the steps discussed above in connection with FIG. 2. Some of the steps were amended and some were omitted as will be explained in further detail below.

Concerning steps S1 to S7, the steps correspond to those discussed above in connection with FIG. 2 so that the detailed explanation of these steps is omitted. However, in the embodiment of FIG. 3, step S7a of FIG. 2 is omitted so that not the MP-TCP controller informs the involved network multipath proxy 180 about the session identifier which, in the present case, is the public IP address combined with the port number to be used by the remote client. Step S8 also corresponds to step S8 of FIG. 2. Former step S9, however, has been amended compared to the embodiment of FIG. 2. New step S13, which is also the request for setting up the MP-TCP session includes, in addition to the internal IP number and port number, also the public IP address and public port number. Thus, the session identifier is in this case not received from the MP-TCP controller 100, but from the residential multipath entity 200. The other steps S11 and S12 correspond again to the steps shown in FIG. 2.

Figure 3:
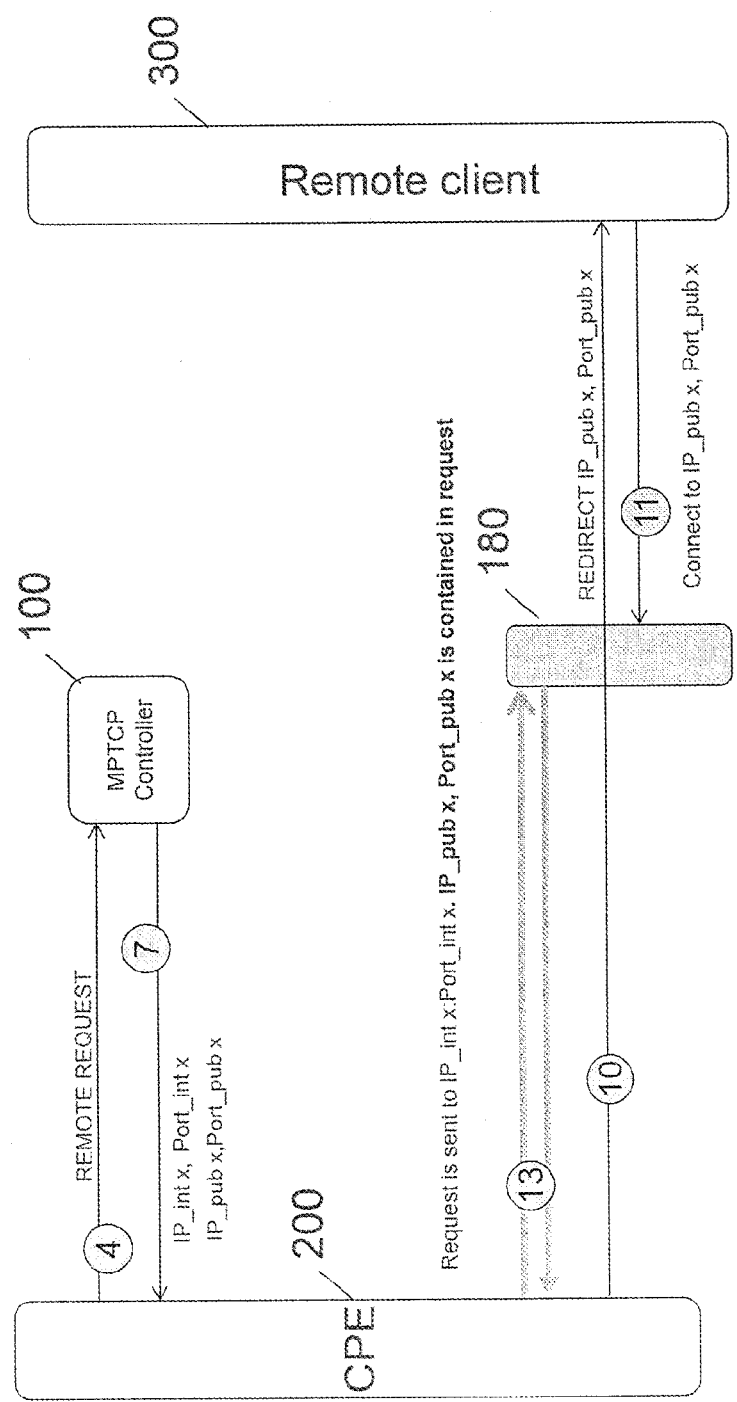
FIG. 3 shows a schematic view of the message exchange of the entities shown in FIG. 2 in a slightly different embodiment.

In both the embodiments shown in FIGS. 2 and 3, the public IP and port number was used as session identifier.

Figure 4:
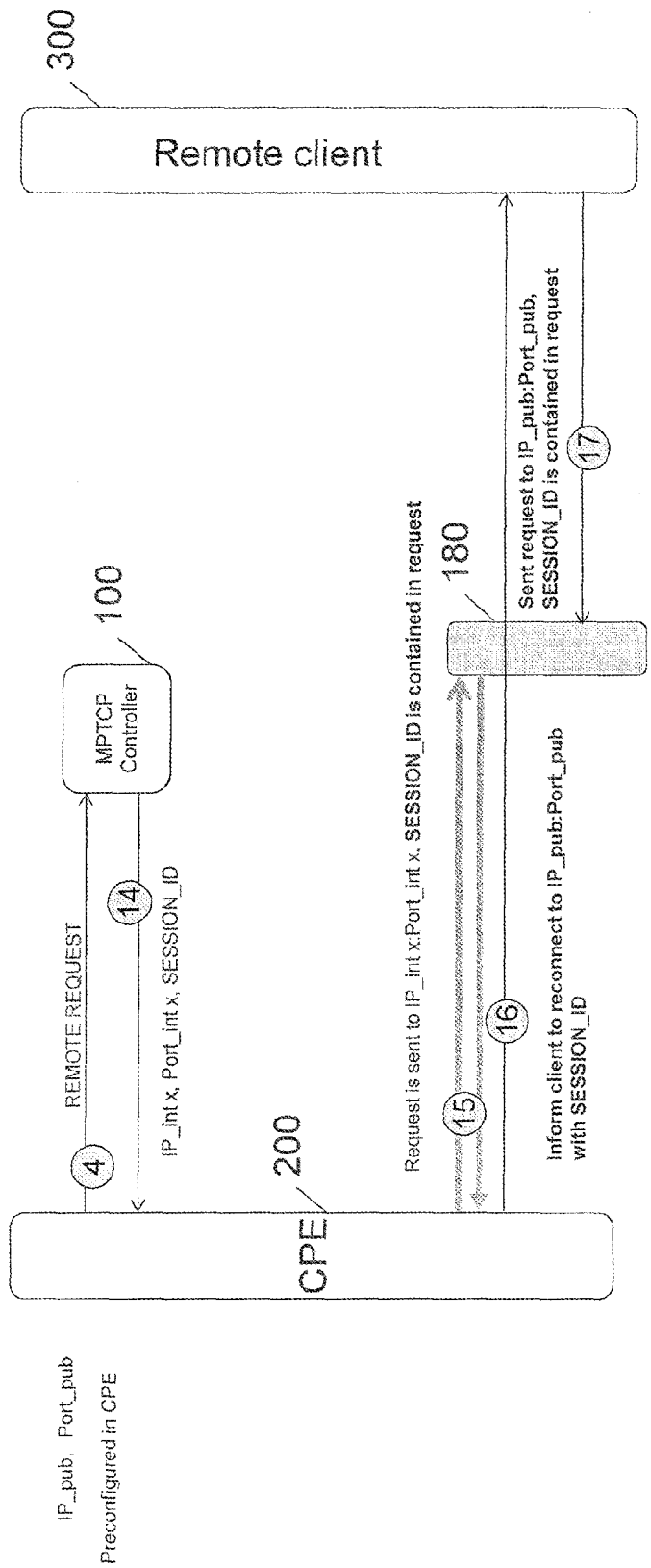
FIG. 4 shows a schematic view of the message exchange of the entities shown in FIG. 2 according to another embodiment.

In connection with FIG. 4, a slightly amended embodiment is disclosed. In the embodiment of FIG. 4, step S7 of the embodiments disclosed in FIGS. 2 and 3 was amended as a new step S14, in which in response to the received session request of step S4, the session response includes, instead of the public port and IP address, a session ID as a session identifier. The session identifier can be included into the response in any format which could be a 32 bit unsigned integer The CPE 200 has a pre-configured relationship stored in which a public IP address and port number is linked to the session ID. Step S15 differs from step S13 by the fact that not the public IP address and port number is included into the session request sent to the proxy 180, but that the session ID is contained in the request, the session ID corresponding to the session ID received in step S14. Step S16 has also been slightly amended compared to step S10 in that the redirect message not only includes the public IP address and port number to be used by the remote client, but also the session ID as received in step S14. The public IP address is determined based on a pre-configured relationship between session ID and public IP address and based on the session ID received in step S14. Step S17 is also amended compared to steps S11 shown in the embodiments of FIGS. 2 and 3 as the remote client transmits the request transmitted to the public IP address and port number including the session ID. Based on information received in steps S15 and S17, the multipath proxy 180 can again generate a binding between the two different sessions. In steps S14, S15 and S16, the session ID is the session identifier.

Figure 5:
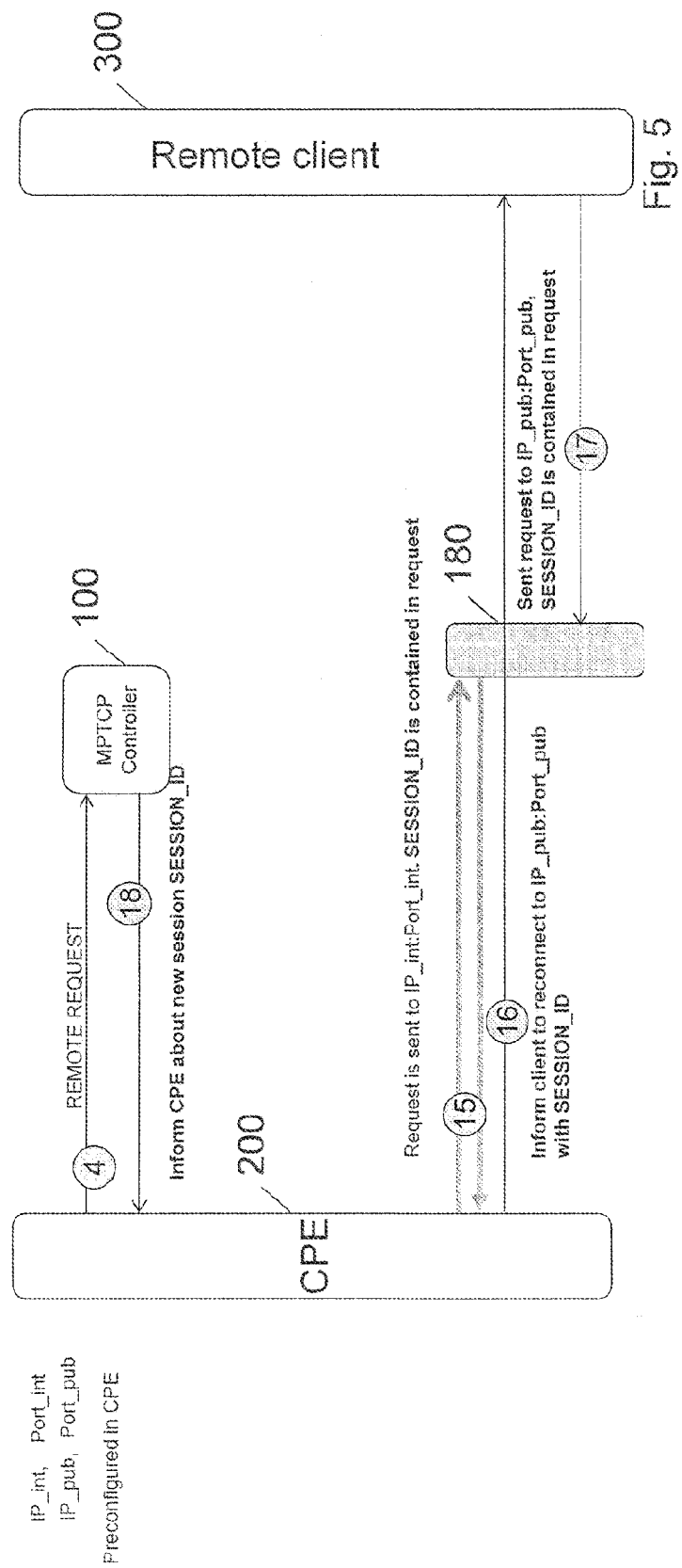
FIG. 5 shows a schematic view of a message exchange similar to FIG. 2 according to still another embodiment.

FIG. 5 shows still another slight amendment compared to the embodiment shown in FIGS. 2 to 4. The first difference can be seen in former step S7, new step S18, in which the control entity in the response to the session request only transmits the session ID as session identifier. In this embodiment, the residential multipath entity can determine based on the session identifier, the corresponding internal and public IP addresses and port numbers as there is a pre-configured link stored in the entity 200, which links the session ID to the IP addresses and port numbers. Step S15 corresponds to step S15 of FIG. 4, and steps S16 and S17 also correspond to the steps discussed in connection with FIG. 4.

Figure 6:
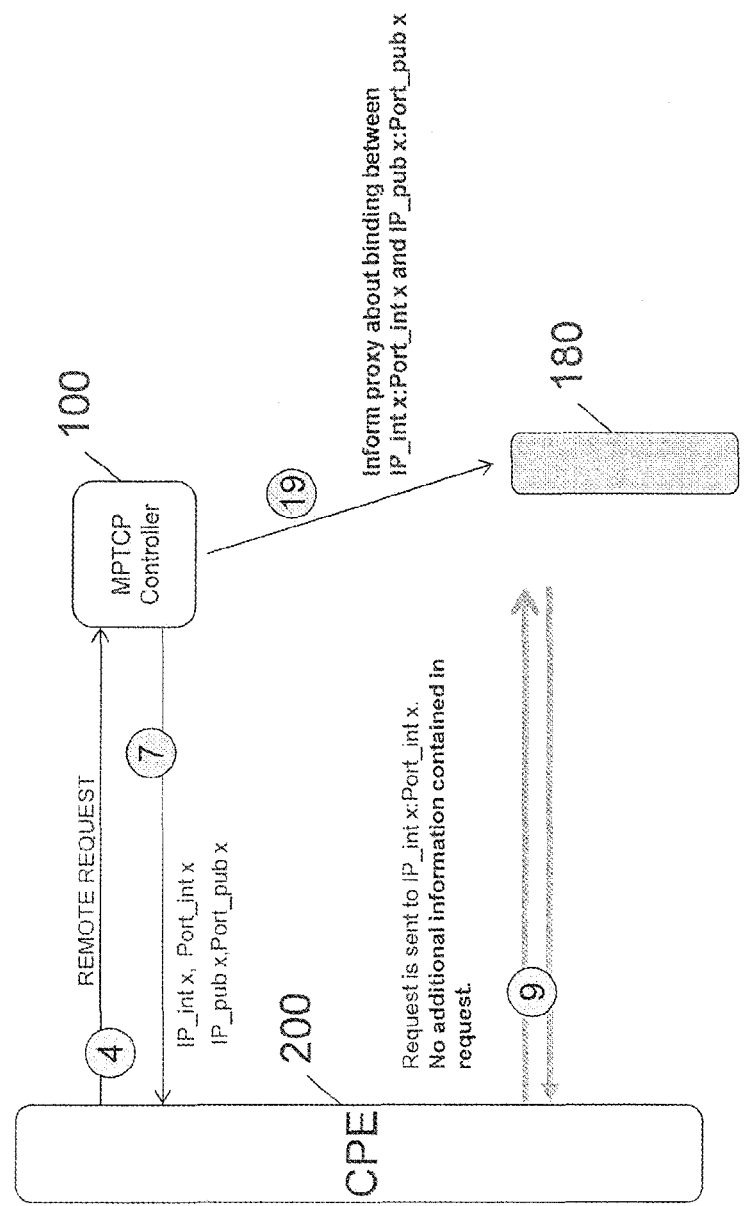
FIG. 6 shows a schematic view of the message exchange as shown in FIG. 2 according to another embodiment.

In connection with FIG. 6, a further embodiment is disclosed, which is similar to the embodiment shown in FIG. 2. The only difference to the embodiment shown in FIG. 2 can be seen in step S19, which replaces step S7a of FIG. 2. In step S19, the control entity 100 includes, in addition to the internal IP address and port number, the public IP address and port number so that again the network multipath proxy 180 is able to combine the sessions generated in step S9 and S11 of FIG. 2 and received at the internal IP address and external IP address.

Figure 7:
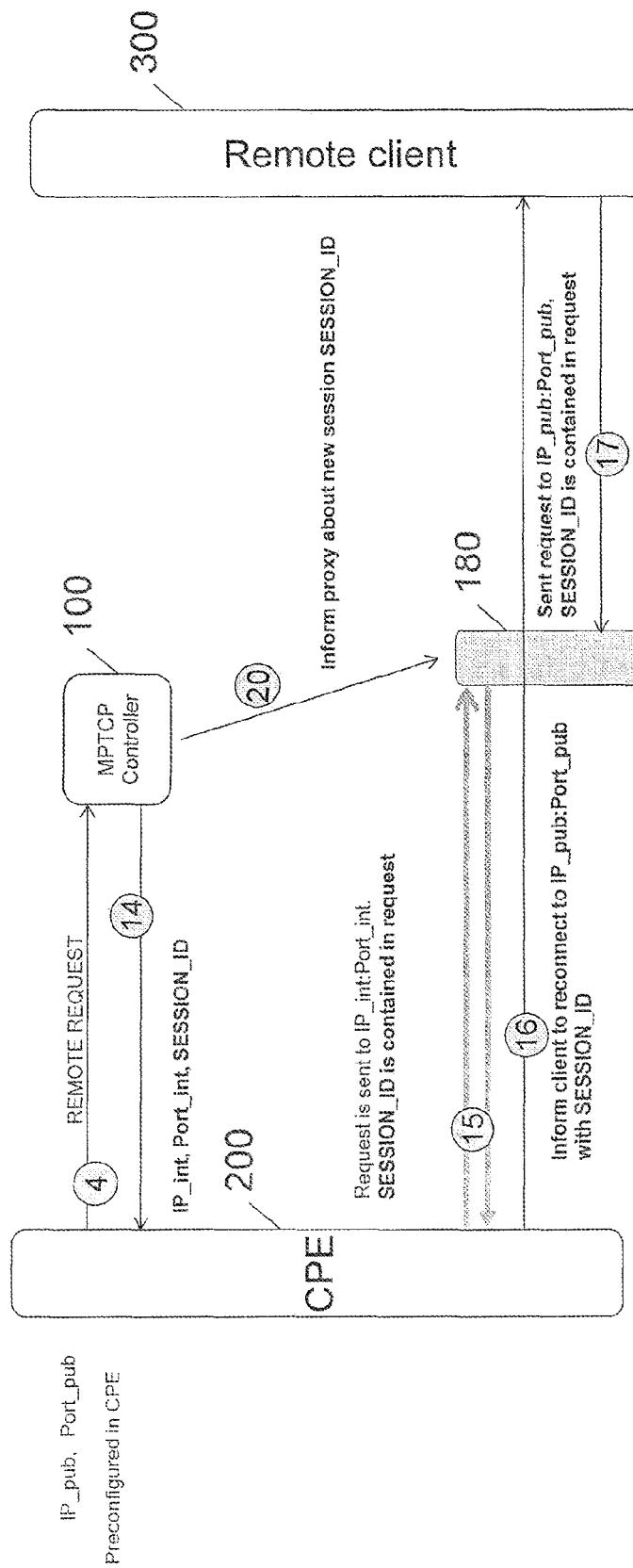
FIG. 7 shows a schematic view of a message exchange as shown in FIG. 2 according to another embodiment.

The embodiment of FIG. 7 is similar to the embodiment of FIG. 4, in which step S14 was used to inform the multipath entity 200 about the session ID and where the public IP address and port numbers are deduced based on the received session ID. In step S20, the controller informs the network proxy 180 about the new session ID. Steps S15 to S17 correspond to the steps explained above in connection with FIG. 4. Step S20, informing the network multipath proxy 180 about the session ID, is optional and helps to avoid denial-of-service-attacks. The proxy knows a priori which session IDs have been created. Thus, it could reject requests with an unknown session ID.

Figure 8:
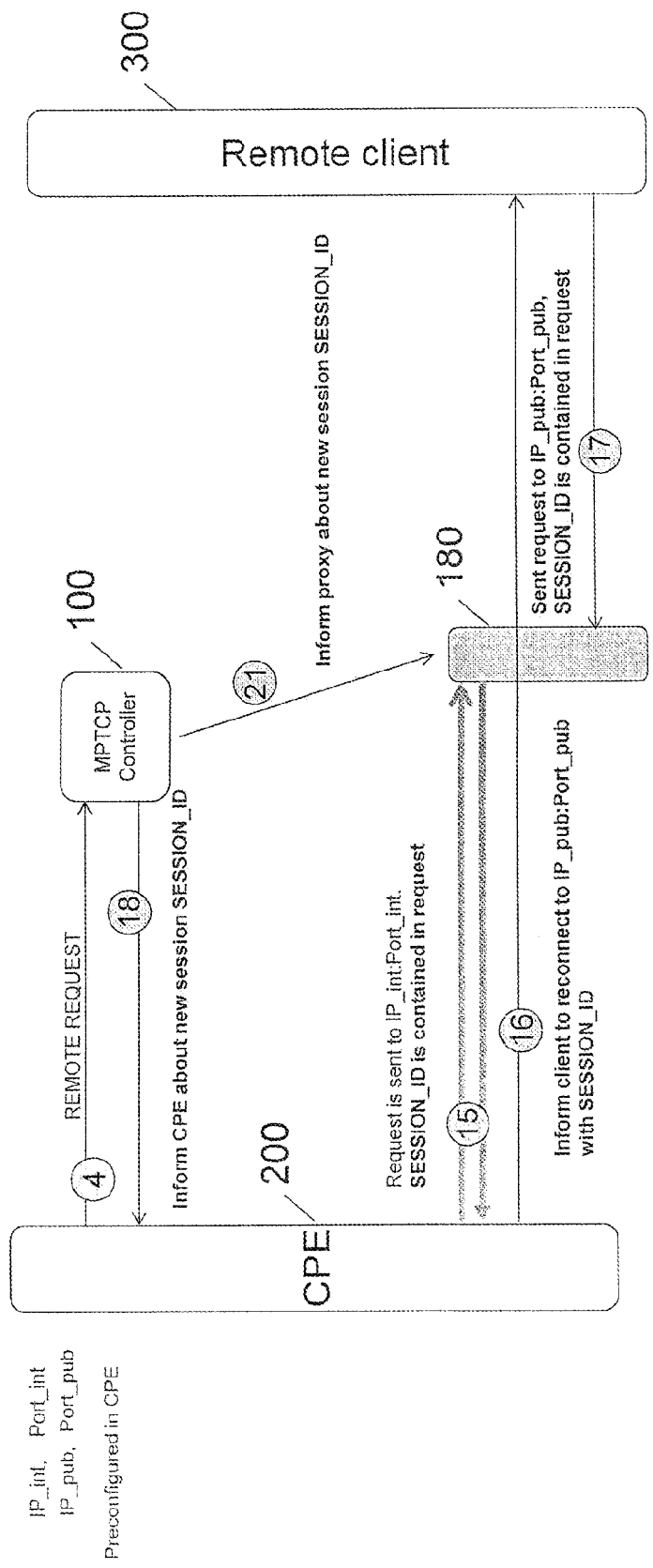
FIG. 8 shows a schematic view of a message exchange as shown in FIG. 2 according to another embodiment.

FIG. 8 is similar to the embodiment of FIG. 5 so that the MP-TCP controller 100 in step S18 only uses the session ID, and the multipath entity 200 determines the internal and the public IP addresses based on the received session ID. Steps S15 to S17 correspond to steps S15 to S17 of FIG. 5. However, additionally, in step S21 the proxy is informed about the session ID. As in FIG. 7 step S21 is optional.

In FIGS. 7 and 8, the session ID is the session identifier.

Figure 9:
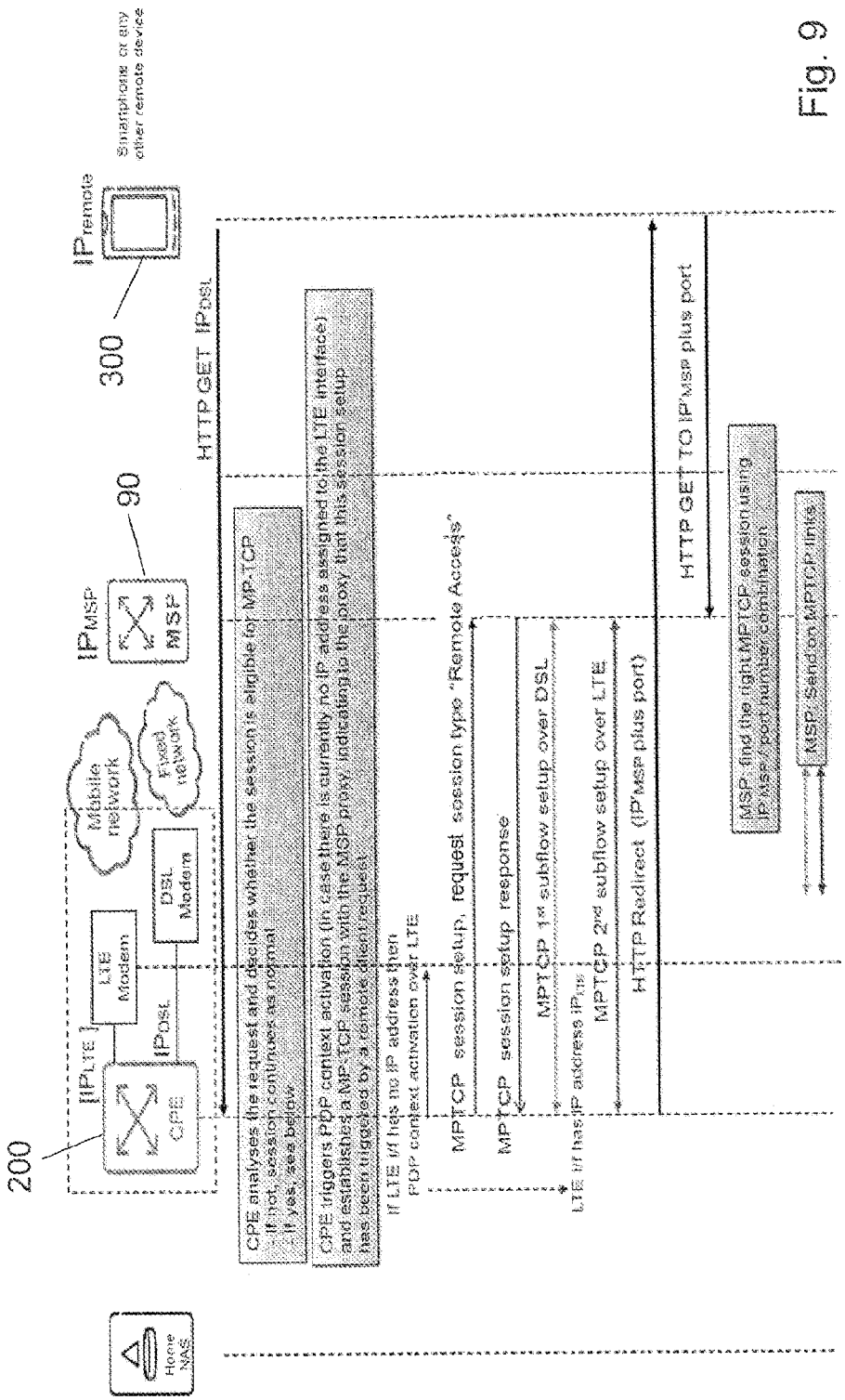
FIG. 9 shows a schematic high-level message flow between the involved entities.

FIG. 9 shows a high-level summary of the embodiment of FIG. 2, in which only the multipath proxy 180 is shown as multi-service proxy, MSP, 90 and wherein the residential multipath entity or CPE 200 are shown with the included interfaces used for the multipath connection, here the LTE modem and the DSL modem. MSP 90 is considered as a node including the MP-TCP controller 100, the load balancing entity 150 and the network multipath proxy 180. Step S90 from the remote client device corresponds to step S1 as shown in FIG. 2 and as explained above in connection with FIG. 2. In step S91, it is decided whether the session is eligible for a multipath TCP session. If this is the case, the CPE triggers the PDP context activation in step S92 if there was no IP address assigned to one of the interfaces, here the LTE interface, and establishes an MP-TCP session with the MSP proxy indicating that the session setup has been triggered for a remote client access as discussed above in the context with step S4. If no IP address has been assigned yet, a PDP context activation over LTE occurs in step S93 as in step S8. As in step S9 of FIG. 2, the MP-TCP session is set up in steps S94 and S95 so that a first multipath sub-flow is set up over one of the multipath connections (S96), here the DSL connection, whereas the second sub-flow is set up over a mobile communications network between CPE 200 and the proxy (S97). Furthermore, as in step S10, the redirect message is transmitted to the remote client including the IP address received from the MSP, which in this case includes the controller 100 of FIG. 2 (S98). The remote client device accesses the MSP using the received IP address and port number (S99). The proxy can then find the right MP-TCP session using the IP address and port number combination (S100).

Figure 10:
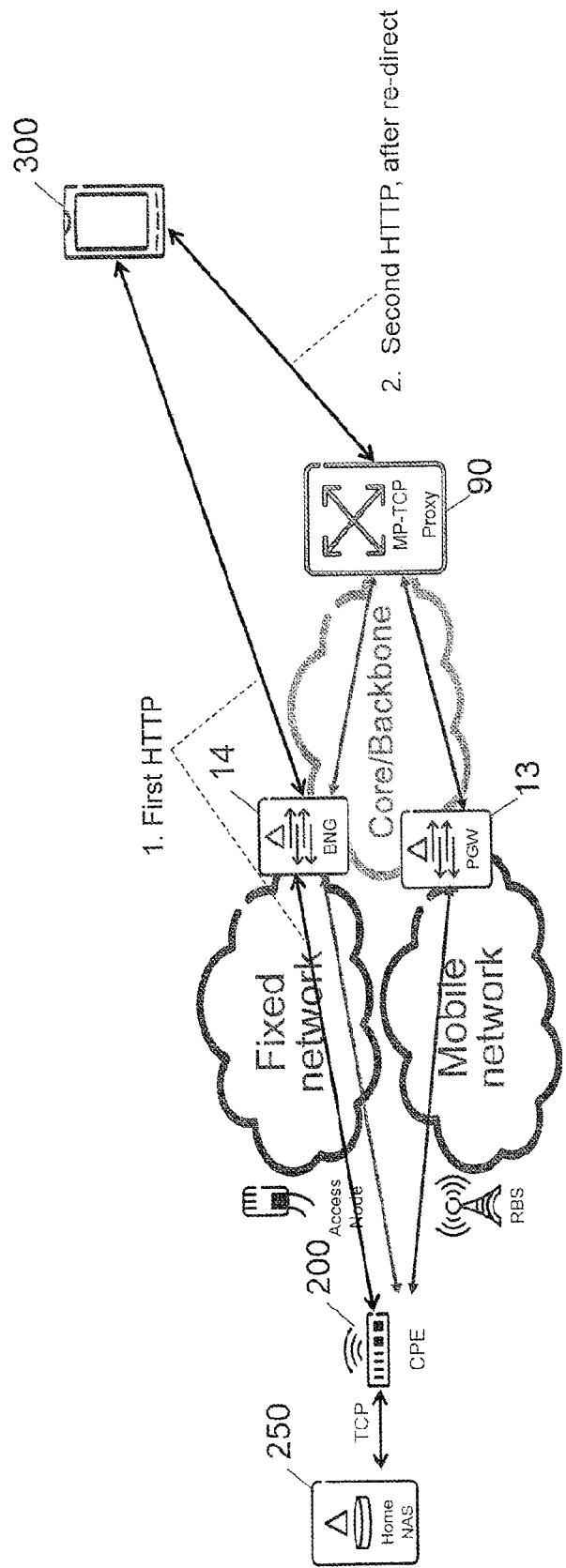
FIG. 10 shows a schematic view of the generated multipath connection between the client device and a server.

FIG. 10 shows the generated multipath connection and some of the exchanged messages in the network architecture overview. The mobile entity or remote client 300 which is not necessarily a "mobile" entity but could also be a device attached to a fixed network like DSL, then requests a remote access to home server 250 via a residential multipath entity 200 so that, as shown in FIG. 2, the first request of step S1 is sent via a border network gateway 14 to the residential multipath entity 200. As the remote client device 300 is then informed about the public IP address and port number of the network multipath proxy as discussed above, the second HTTP request corresponding to step S11 of FIG. 2 can then be sent to the MSP 90. In the embodiment of FIG. 10 the multipath proxy is indicated with reference numeral 90 and includes the MP-TCP controller 100, the load balancing entity 150 and the different multipath proxies 180a to 180n of FIG. 2. The remote client device 300 cannot directly access the multipath proxy as it does not know the address of the multipath proxy involved in the multipath connection.

Figure 11:
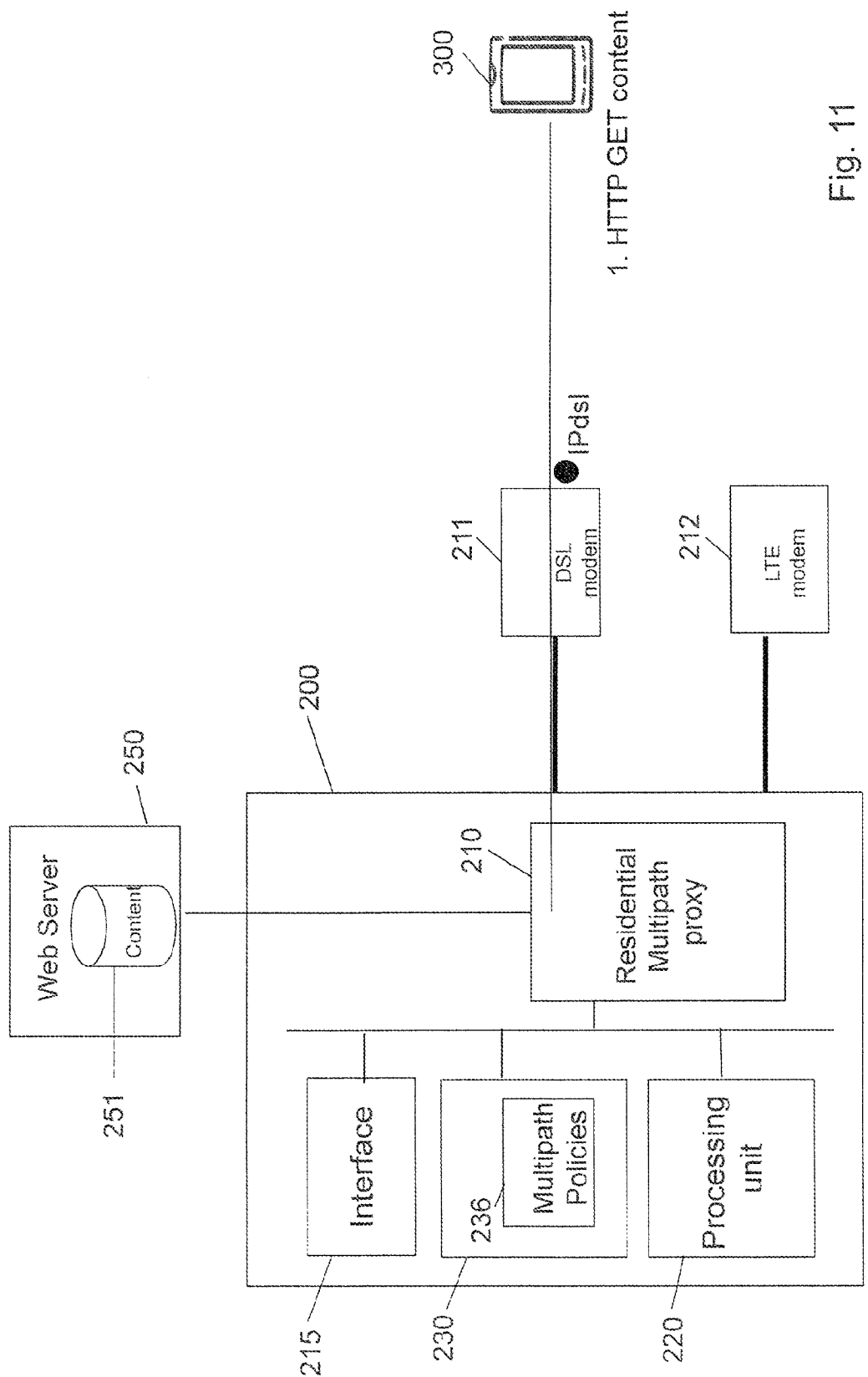
FIG. 11 shows a schematic architectural view of a residential multipath entity involved in a multipath connection.

FIG. 11 shows a schematic view of the residential multipath entity involved in the different message flows discussed above. The multipath entity 200 comprises a residential multipath proxy 210 which is connected to DSL modem 211 and LTE modem 212 in the embodiment of FIG. 11. In the embodiment shown, a single one-path connection is set up between the remote client device 300 and the residential multipath entity 200. In addition to this residential multipath proxy 210 which handles the data session exchange with the remote client device 300, interface 215 is provided which represents the possibility of the multipath entity to communicate with other entities, i.e. to transmit and receive control messages or user data from other entities. A processing unit 220 comprising one or more processors is provided and is responsible for the operation of the residential multipath entity 200. The processing unit 220 can generate the commands that are needed to carry out the procedures in which the multipath entity 200 is involved. A memory unit 230 is provided which can, inter alia, include the multipath policies 236, which indicate whether a multipath connection can be set up or not. The memory unit 230 can furthermore store a suitable program code to be executed by the processing unit 220 or to be executed by any of the other entities shown in FIG. 11. The residential multipath proxy is connected to web server 250, the web server including the content 251, the remote client device wants to access.

Figure 12:
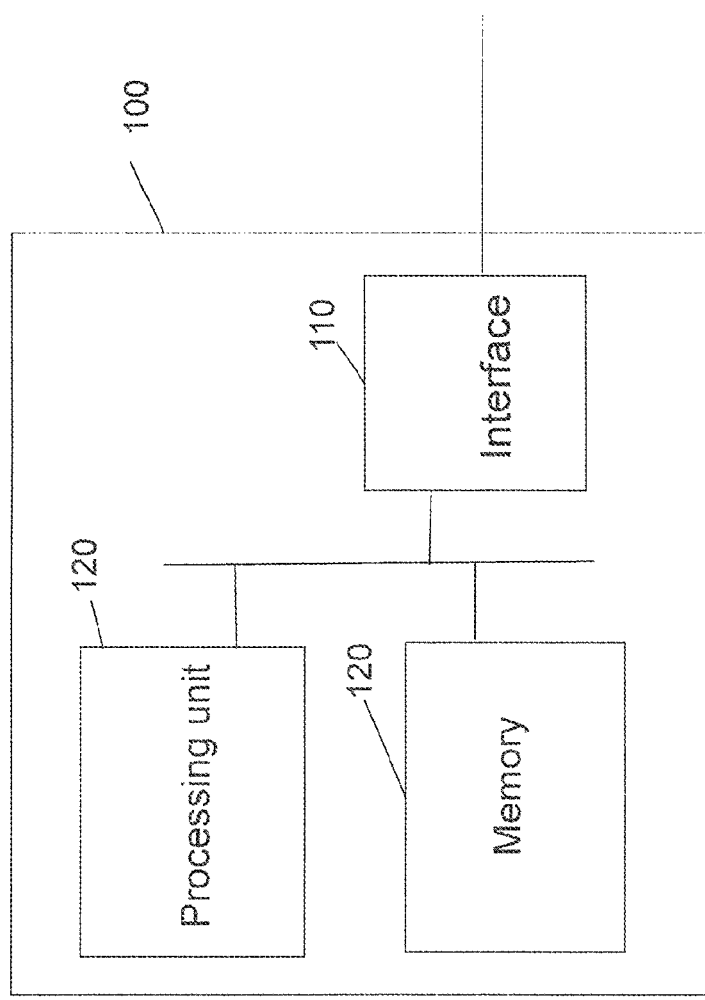
FIG. 12 shows a schematic architectural representation of a multipath controller involved in a multipath connection.

FIG. 12 shows an exemplary view of the multipath control entity 100 which comprises an interface 110 for the communication with the other entities such as the residential multipath entity 200 or the load balancing entity 150. The interface 110 can be used for the transmission and for the reception of control messages or user data. A processing unit 120 comprising one or more processors is provided and is responsible for the operation of the multipath control entity as discussed above and further below. The memory 130 can store a suitable program code to be carried out by the processing unit 120 in order to carry out the procedures of the multipath control entity in which the multipath control entity is involved.

It should be understood that the multipath control entity 100 or the residential multipath entity 200 can include further functional entities. Furthermore, in these entities the functional components need not to be separated as indicated in connection with FIGS. 11 and 12. Other combinations of functional units are possible.

Reference was furthermore made to the remote client device, which may be any type of communication device, e.g. a mobile phone, a portable computer, a laptop, a smart television screen, a tethering access point node, a vehicle such as a car implementing communication functionality, etc.

Figure 13:
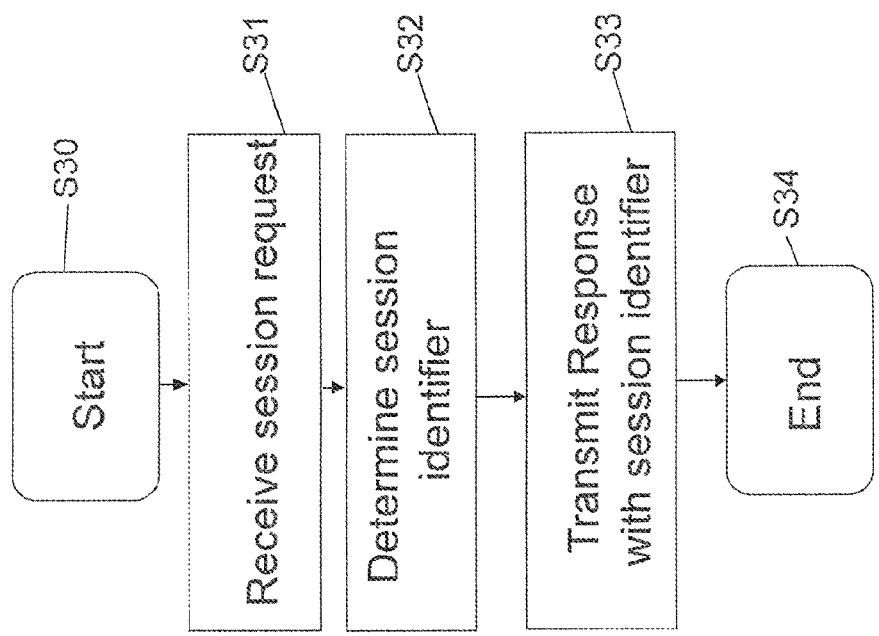
FIG. 13 shows a flowchart comprising the steps carried out by a multipath control entity according to one embodiment of the invention.

FIG. 13 summarizes some of the steps carried out by the multipath control entity. The method starts in step S30, and in step S31 a session request is received which indicates that a remote access to the server is requested. The session request can correspond to step S4 of FIG. 2. In an additional step, a session identifier is determined in step S32. The session identifier can be an IP address and port number, however, the session identifier can include a session ID which does not directly indicate the IP address and port number to be used by the remote client device 300 for the remote access to the network multipath proxy 180. In step S33, the session response is transmitted back to the residential multipath entity as discussed, inter alia, in step S7 of FIG. 2 or in step S14 of FIG. 4. The method ends in step S34. As discussed in some of the embodiments, the multipath control entity may furthermore inform the network multipath proxy about the session identifier. However, this step may also be carried out by the residential multipath entity 200 and not by the multipath control entity 100.

Figure 14:
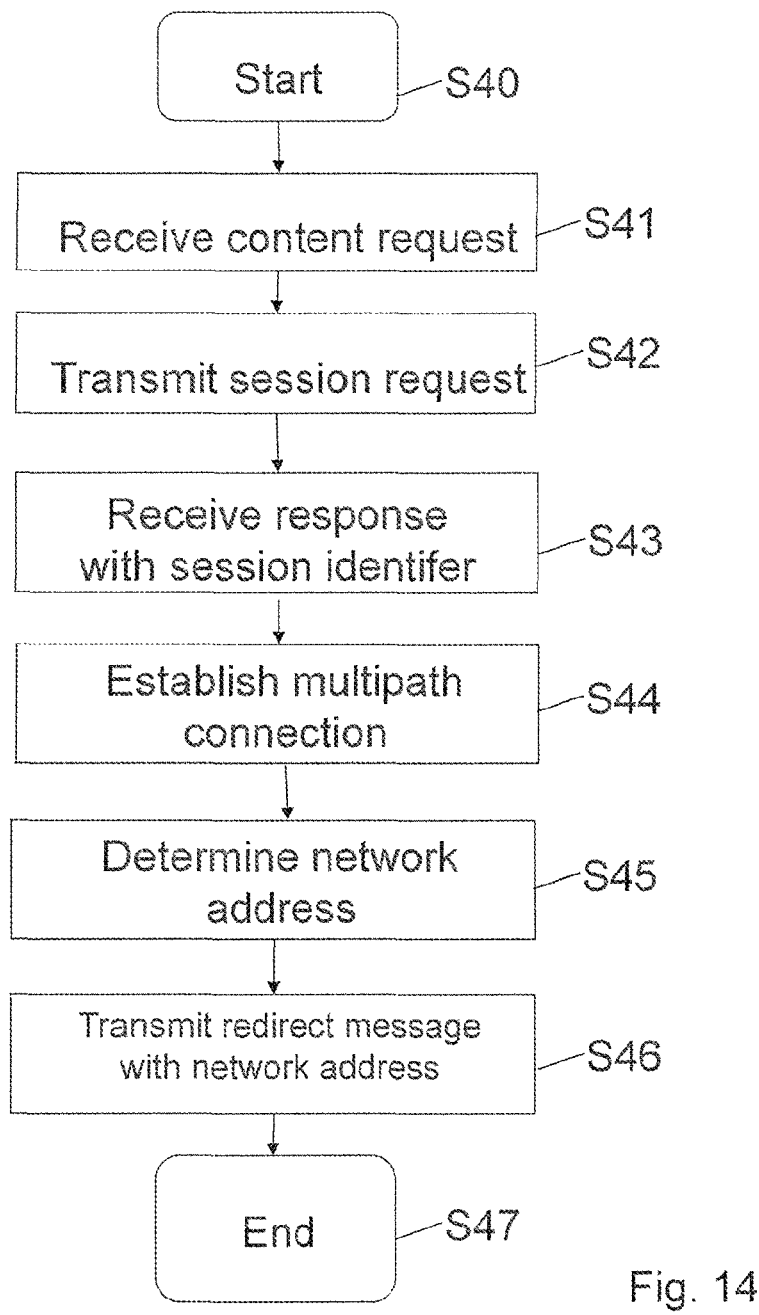
FIG. 14 shows a flowchart carried out by a residential multipath entity involved in a multipath connection according to an embodiment of the invention.

In FIG. 14, some of the steps carried out by the residential multipath entity 200 are summarized. The method starts in step S40, and in step S41 a content request is received, wherein the content request is received from the remote client device 300 for the remote access. As discussed above in connection with FIG. 13, in step S42 the session request is generated and transmitted from the residential multipath entity 200 to the multipath control entity 100, wherein the session response is received in step S43 including the session identifier. In step S44, a multipath connection is established between the residential multipath entity 200 and the network multipath proxy 180, and the network address is determined in step S45, which is the network address of the network multipath proxy to be used by the remote client device 300 for the remote access. In step S45, as far as the determination of the network address is concerned, the network address may be simply deduced as it is contained in the session response as, inter alia, shown in FIG. 2. However, in another embodiment a session identifier not including the network address may be received as discussed in connection with FIG. 3 or other figures, and based on the session ID, the residential multipath entity determines the public IP address using a pre-configured configuration. In step S46, the redirect message with the network address is transmitted to the remote client device 300 so that the remote client device can then use the received network address for accessing the network multipath proxy 180. The method ends in step S47.

From the above discussion, some general conclusions can be drawn.

As far as the multipath control entity 100 is concerned, when a pool of network multipath proxies 180a-180n are used, one of the network multipath proxies of the pools is identified which will be involved in the multipath connection. Furthermore, the identified network multipath proxy is then informed about the session identifier. This was discussed, inter alia, in connection with steps S5 and S6 of FIG. 2.

The multipath connection can include a wired transmission network and a cellular transmission network. However, the invention is not restricted to one wireless and one wired network. Also two or more different wired networks or two or more wireless networks may be used for the multipath connection.

Furthermore, in some of the embodiments, the multipath control entity 100 informed the network multipath proxy 180 involved in the multipath connection about the determined session identifier for the remote access. This was carried out, inter alia, in step S7a of FIG. 2.

Furthermore, the response which is transmitted in response to the received session request can include the internal network address to be used by the residential multipath proxy 180 for the multipath connection to the network multipath proxy 180. By way of example, step S7 of FIG. 2 contains the internal IP address and port number of the network multipath proxy 180.

Furthermore, the determination of the session identifier can comprise the determination of the network address of the network multipath proxy to be used by the client device for the remote access, wherein the determined network address is then transmitted back to the residential multipath entity as, inter alia, shown in step S7 of FIG. 2. Furthermore, the multipath control entity 100 can inform the network multipath proxy 180 about the determined network address as shown in step 7a of FIG. 2.

As far as the residential multipath entity is concerned, the session request message may be transmitted to the network multipath proxy 180 for setting up the data session including the multipath connection. Furthermore, the residential multipath entity 200 may determine whether a multipath connection including the at least two transmission networks between the client device 300 and the residential multipath entity 200 is allowable for the data session based on multipath policies. Only if the multipath policy is allowed in a multipath connection, the session request is transmitted to the multipath control entity.

The received session response received by the residential multipath entity 200 from the multipath control entity 100 can furthermore include the internal network address of the network multipath proxy 180 and the session request message transmitted to the network multipath proxy can be transmitted to the internal network address received in the session response.

Furthermore, the session request transmitted from the residential multipath entity 200 to the network multipath proxy 180 can comprise the session identifier if the session identifier was not received from the multipath control entity 100. The determined session identifier may be the network address of the network multipath proxy, or the session request message transmitted to the network multipath proxy may comprise the session ID and the network address of the network multipath proxy.

The determination of the network address of the multipath proxy to be used by the client device may be also be carried out based on a pre-configured link between the session identifier and the network address of the network multipath proxy. Furthermore, the residential multipath entity 200 may determine whether a network address is assigned to each interface 211, 212 used for the multipath connection. If this is not the case, a network address is assigned to the interface for which no network address was present before. Furthermore, the redirect message transmitted to the client device 300 can comprise the network address of the network multipath proxy and the session identifier.

Additionally, it has been shown that a multipath control entity is provided comprising a processing unit and a memory, wherein the memory contains instructions executable by the processing unit, whereby the apparatus is operative to carry out the different steps mentioned above in which the multipath control entity is involved. Thus, the apparatus is operative to work as discussed above. Furthermore, an apparatus is provided comprising means adapted to carry out the above mentioned steps in which the multipath control entity is involved.

In the same way, a residential multipath entity is provided comprising a processing unit 220 and a memory 230, wherein the memory contains instructions executable by the processing unit, whereby the residential multipath entity is operative to carry out the different steps mentioned above in which entity 200 is involved.

Furthermore, the residential multipath entity 200 is provided comprising means adapted to carry out the above mentioned steps in which the multipath control entity is involved.

Summarizing, the invention enables the access of a remote client device to home content. Furthermore, the combination of the IP address and port number determined by the multipath control entity in some of the embodiments can be used for load balancing on the different network multipath proxies and can be used for mapping the incoming HTTP request to the MP-TCP session which was triggered by the residential multipath entity.

The invention claimed is:

1. A method for controlling, by a multipath control entity, remote access from a client device to a server via a multipath connection, the server connected to a residential multipath entity, the multipath connection including at least two transmission networks between the client device and the server, the method comprising:
   receiving a session request for an establishment of a data session from the residential multipath entity, the session request indicating that the session request is for remote access to the server;
   determining a session identifier for the remote access, the remote access including the multipath connection; and
   transmitting, in a response to the received session request, the determined session identifier back to the residential multipath entity.

2. The method according to claim 1, wherein a pool of network multipath proxies is present, further comprising:
   identifying one network multipath proxy of the pool which will be involved in the multipath connection; and
   informing the identified network multipath proxy about the session identifier for the remote access.

3. The method according to claim 1, wherein the multipath connection comprises a wired transmission network and a cellular transmission network.

4. The method according to claim 1, further comprising:
   informing a network multipath proxy involved in the multipath connection about the determined session identifier for the remote access.

5. The method according to claim 1, wherein the response further comprises an internal network address to be used by a residential multipath proxy for the multipath connection to a network multipath proxy.

6. The method according to claim 1, wherein determining a session identifier comprises determining a network address of a network multipath proxy to be used by the client device for the remote access.

7. The method according to claim 6, wherein the network multipath proxy is informed about the determined network address.

8. The method according to claim 6, wherein the determined network address is transmitted back to the residential multipath entity.

9. The method according claim 6, wherein the determined network address comprises an IP address and a port number of the network multipath proxy to be used by the client device for the remote access.

10. A method for operating a residential multipath entity connected to a server, the residential multipath entity configured to provide a multipath connection, the multipath connection including at least two transmission networks between the server and a client device, the method comprising:
    receiving a content request from the client device for remote access to content provided on the server;
    transmitting, to a multipath control entity, a session request for an establishment of a data session, wherein the data session includes the multipath connection, and the session request indicates that the session request is for the remote access from the client device to the server;
    receiving a session response from the multipath control entity, the session response comprising a session identifier for the remote access, the remote access including the multipath connection;

establishing the multipath connection between a residential multipath proxy and a network multipath proxy involved in the multipath connection to be used by the client device for the remote access;
determining a network address of a network multipath proxy taking into account the received session identifier; and
transmitting a redirect message to the client device including the determined network address of the network multipath proxy.

11. The method according to claim 10, wherein it is determined whether a multipath connection including at least two transmission networks between the client device and the residential multipath entity is allowable for the data session based on multipath policies, wherein the session request is transmitted to the multipath control entity only if the multipath policies allow the multipath connection.

12. The method according to claim 10, wherein the network address of the network multipath proxy to be used by the client device for the remote access is determined based on a preconfigured link between the session identifier and the network address of the multipath proxy.

13. The method according to claim 10, wherein it is determined whether a network address is assigned to each interface used for the multipath connection, wherein, if this is not the case, a network address is assigned to the interface for which no network address was present before.

14. The method according to claim 10, wherein the redirect message transmitted to the client device comprises the network address of the multipath proxy and the session identifier.

15. The method according to claim 10, further comprising transmitting a session request message to the network multipath proxy for setting up the data session via the multipath connection.

16. The method according to claim 15, wherein the received session response further comprises an internal network address of the network multipath proxy, and wherein the session request message is transmitted to the internal network address of the network multipath proxy.

17. The method according to claim 15, wherein the session request message transmitted to the network multipath proxy comprises the determined session identifier.

18. The method according to claim 17, wherein the determined session identifier is the network address of the network multipath proxy to be used by the client device for the remote access.

19. The method according to claim 17, wherein the session request message comprises the determined session identifier and the network address of the network multipath proxy to be used by the client device for the remote access.

20. The method of claim 10, wherein the redirect message instructs the client device to resend a connection request originally sent to the residential multipath entity to the network multipath proxy using the determined network address.

21. A multipath control entity configured to control a remote access from a client device to a server via a multipath connection, the server connected to a residential multipath entity, the multipath connection including at least two transmission networks between the client device and the server, the multipath control entity comprising:
an interface configured to receive a session request for an establishment of a data session from the residential multipath entity, the session request indicating that the session request is for the remote access to the server;
at least one processing circuit configured to:

determine a session identifier for the remote access for the multipath connection; and
initiate, via the interface, in response to the received session request, the transmission of the determined session identifier back to the residential multipath entity.

22. The multipath control entity according to claim 21, wherein a pool of network multipath proxies is present, and wherein the at least one processing circuit is configured to:
identify one network multipath proxy of the pool which will be involved in the multipath connection; and
inform, via the interface, the identified network multipath proxy about the session identifier for the remote access.

23. The multipath control entity according to claim 21, wherein the at least one processing circuit is configured to inform, via the interface, a multipath proxy involved in the multipath connection about the determined session identifier for the remote access.

24. The multipath control entity according to claim 21, wherein the at least one processing circuit is configured, for determining the session identifier, to determine a network address of a network multipath proxy to be used by the client device for the remote access.

25. The multipath control entity according to claim 24, wherein the at least one processing circuit is configured to transmit, via the interface, the determined network address back to the residential multipath entity.

26. The multipath control entity according to claim 25, wherein the at least one processing circuit is configured to inform, via the interface, the network multipath proxy about the determined network address.

27. A residential multipath entity configured to provide a multipath connection, the multipath connection including at least two transmission networks between a server and a client device, the residential multipath entity comprising:
an interface for communication to at least the server, the client device and a multipath control entity, the interface being configured to receive a content request from the client device for a remote access to content provided on the server;
at least one processing circuit configured to transmit, via the interface, a session request for an establishment of a data session, the data session including the multipath connection to the multipath control entity, the session request indicating that the session request is for the remote access from the client device to the server;
the interface being configured to receive a session response from the multipath control entity, the session response comprising a session identifier for the remote access including the multipath connection;
a proxy configured to establish a multipath connection between the residential multipath entity and the network multipath proxy in the multipath connection, wherein the at least one processing circuit is configured to:
determine a network address of a network multipath proxy to be used by the client device for the remote access taking into account the received session identifier, and
transmit, via the interface, a redirect message to the client device including the network address to be used by the client device for the remote access.

28. The residential multipath entity according to claim 27, wherein the at least one processing circuit is configured to transmit, via the interface, a session request message to the network multipath proxy for setting up the data session including the multipath connection.

29. The residential multipath entity according to claim 27, wherein the at least one processing circuit is configured to determine whether a multipath connection is allowable for the data session based on multipath policies, wherein the multipath connection includes at least two transmission networks between the client device and the residential multipath proxy; and
wherein if the multipath policies allow the multipath connection, the at least one processing circuit is configured to transmit, via the interface, the session request to the multipath control entity.

30. The residential multipath entity according to claim 27, wherein the received session response further comprises an internal network address of the network multipath proxy; and
wherein the at least one processing circuit is configured to transmit, via the interface, the session request message to the internal network address of the network multipath proxy.

31. The residential multipath entity according to claim 30, wherein the at least one processing circuit is configured to determine whether a network address is assigned to each interface used for the multipath connection; and
wherein, if this is not the case, the at least one processing circuit is configured to assign a network address to the interface for which no network address was present before.

32. A system comprising:
a multipath control entity configured to control remote access from a client device to a server via a multipath connection, wherein the server is connected to a residential multipath entity, and wherein the multipath connection includes at least two transmission networks between the client device and the server, the multipath control entity comprising:
    an interface configured to receive a session request for an establishment of a data session from the residential multipath entity, the session request indicating that the session request is for the remote access to the server;
    at least one processing circuit configured to:
        determine a session identifier for the remote access for the multipath connection; and
        initiate, via the interface, in response to the received session request, the transmission of the determined session identifier back to the residential multipath entity; and
the residential multipath entity configured to provide the multipath connection, the residential multipath entity comprising:
    an interface for communication to at least the server, the client device and the multipath control entity, the interface being configured to receive a content request from the client device for a remote access to content provided on the server;
    at least one processing circuit configured to transmit, via the interface, the session request for an establishment of the data session, the data session via the multipath connection to the multipath control entity;
    the interface being configured to receive the session response from the multipath control entity, the session response comprising the session identifier for the remote access including the multipath connection;
    a proxy configured to establish a multipath connection between the residential multipath entity and a network multipath proxy in the multipath connection, wherein the at least one processing circuit is configured to:
        determine a network address of the network multipath proxy to be used by the client device for the remote access taking into account the received session identifier; and
        transmit, via the interface, a redirect message to the client device including the network address to be used by the client device for the remote access.

33. A computer program product stored on a non-transitory, computer readable medium and comprising program instructions, for execution by at least one processor of a multipath control entity, the multipath control entity controlling remote access from a client device to a server connected to a residential multipath entity, via a multipath connection, the multipath connection comprising at least two transmission networks between the client device and the server, the program instructions which when executed by the at least one processor, causes the at least one processor to:
    receive a session request for an establishment of a data session from the residential multipath entity, the session request indicating that the session request is for remote access to the server;
    determine a session identifier for the remote access, the remote access including the multipath connection; and
    transmit, in a response to the received session request, the determined session identifier back to the residential multipath entity.

34. A computer program product stored on a non-transitory, computer readable medium and comprising program instructions, for execution by at least one processor of a residential multipath entity, the residential multipath entity connected to a server and configured to provide a multipath connection, the multipath connection comprising at least two transmission networks between the server and a client device, the program instructions which when executed by the at least one processor, causes the at least one processor to:
    receive a content request from the client device for remote access to content provided on the server;
    transmit, to a multipath control entity, a session request for an establishment of a data session, wherein the data session includes the multipath connection, and the session request indicates that the session request is for the remote access from the client device to the server;
    receive a session response from the multipath control entity, the session response comprising a session identifier for the remote access, the remote access including the multipath connection;
    establish the multipath connection between a residential multipath proxy and a network multipath proxy involved in the multipath connection to be used by the client device for the remote access;
    determine a network address of a network multipath proxy taking into account the received session identifier; and
    transmit a redirect message to the client device including the determined network address of the network multipath proxy.

* * * * *